(12) United States Patent
Letourneau et al.

(10) Patent No.: US 9,675,177 B1
(45) Date of Patent: Jun. 13, 2017

(54) CHAIR LEG EXTENSION APPARATUS TO LEVEL CHAIR ON AN UNEVEN GROUND

(71) Applicants: Ken Letourneau, Whittier, CA (US); Greg Amyx, Bellflower, CA (US)

(72) Inventors: Ken Letourneau, Whittier, CA (US); Greg Amyx, Bellflower, CA (US)

( * ) Notice: Subject to any disclaimer, the term of this patent is extended or adjusted under 35 U.S.C. 154(b) by 0 days.

(21) Appl. No.: 15/238,487

(22) Filed: Aug. 16, 2016

(51) Int. Cl.
*A47C 7/00* (2006.01)
*A47B 91/02* (2006.01)
*A47C 3/40* (2006.01)
*F16B 7/10* (2006.01)
*A47C 4/52* (2006.01)

(52) U.S. Cl.
CPC .............. *A47C 7/008* (2013.01); *A47B 91/02* (2013.01); *A47C 3/40* (2013.01); *A47C 4/52* (2013.01); *F16B 7/10* (2013.01)

(58) Field of Classification Search
CPC ........... A47C 7/008; A47C 7/002; A47C 3/40; A47C 4/52; A47B 91/02; F16B 7/10; E06C 7/42; E06C 7/426; E06C 7/44
USPC ........... 248/188.2, 188.5; 182/201, 204, 205, 182/172; 297/344.12, 344.15, 344.18
See application file for complete search history.

(56) References Cited

U.S. PATENT DOCUMENTS

| 5,464,071 | A | * | 11/1995 | Rice | E06C 7/44 182/111 |
| 5,551,529 | A | * | 9/1996 | Molitor | E06C 7/44 182/111 |
| 6,871,911 | B2 | * | 3/2005 | Alexander, Jr. | A47C 3/36 297/188.21 |
| 6,905,172 | B1 | * | 6/2005 | Barnett | A47C 7/002 248/188.5 |
| 7,293,630 | B1 | * | 11/2007 | Trebec | E06C 7/423 182/172 |
| 8,424,642 | B2 | * | 4/2013 | Lietz | E06C 1/06 182/172 |
| 9,314,100 | B1 | * | 4/2016 | Logan | A47C 1/14 |

* cited by examiner

*Primary Examiner* — Anita M King
(74) *Attorney, Agent, or Firm* — Plager Schack LLP

(57) ABSTRACT

A leg extension apparatus mounted to an existing chair leg to level the chair on an uneven ground is provided. The apparatus includes a bracket assembly having a leg bracket, a first shell bracket coupled to the leg bracket and having a first slot, and a second shell bracket pivotably mounted to the first shell bracket and having a first slot, the first and second shell brackets able to pivotably adjust to an open position to receive the leg of the chair and a closed position to permit the leg of the chair to be enclosed within the first slots of both the first and second shell brackets, and a leg slidably mounted to the leg bracket. The leg slidably adjusts to one of a plurality of locking positions to permit an end of the leg to contact the uneven ground, thereby supporting the chair in a leveled position.

7 Claims, 4 Drawing Sheets

CHAIR LEG EXTENSION APPARATUS TO LEVEL CHAIR ON AN UNEVEN GROUND

BACKGROUND

The embodiments herein relate generally to outdoor seating members such as lawn chairs.

Individuals often use lawn chairs in outdoor settings when engaging in activities such as fishing, outdoor concerts, sports events, camping, and the like. In these locations, the ground may be uneven due to hills, potholes, rocks, or the like. This causes one or more of the lawn chair's legs to sink, which positions the user in the chair at an undesirable angle. Several existing chairs comprise one or more adjustable legs that can extend or compress. However, individuals may be unwilling to purchase these chairs due to cost or other considerations. Many of these individuals already have existing lawn chairs without adjustable legs. For this reason, there is a desire to retrofit one or more legs of these existing lawn chairs to have extendable supplementary leg members that can conform to an uneven ground, thereby eliminating the need for these individuals to purchase new chairs As such, there is a need in the industry for a chair leg extension apparatus for use with an existing leg of a chair that addresses the limitations of the prior art, which effectively supports the chair in a level position when disposed on an uneven ground surface.

SUMMARY

A leg extension apparatus mounted to an existing leg of a chair to level the chair on an uneven ground surface is provided. The leg extension apparatus comprises a bracket assembly comprising a leg bracket, a first shell bracket coupled to the leg bracket and comprising a first slot, and a second shell bracket pivotably mounted to the first shell bracket and comprising a first slot, the first and second shell brackets configured to pivotably adjust to an open position to receive the leg of the chair and a closed position to permit the leg of the chair to be enclosed within the first slots of both the first and second shell brackets, and a leg slidably mounted to the leg bracket, wherein the leg is configured to slidably adjust to one of a plurality of locking positions to permit an end of the leg to contact the uneven ground surface, thereby supporting the chair in a leveled position.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figure 1:
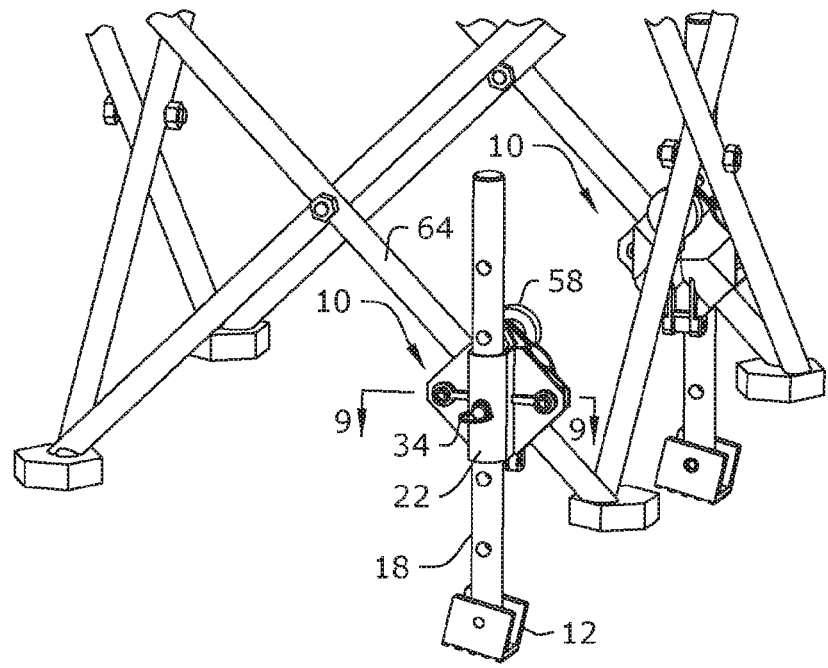
FIG. 1 depicts a perspective view of certain embodiments of the leg extension apparatus shown in use.
Figure 2:
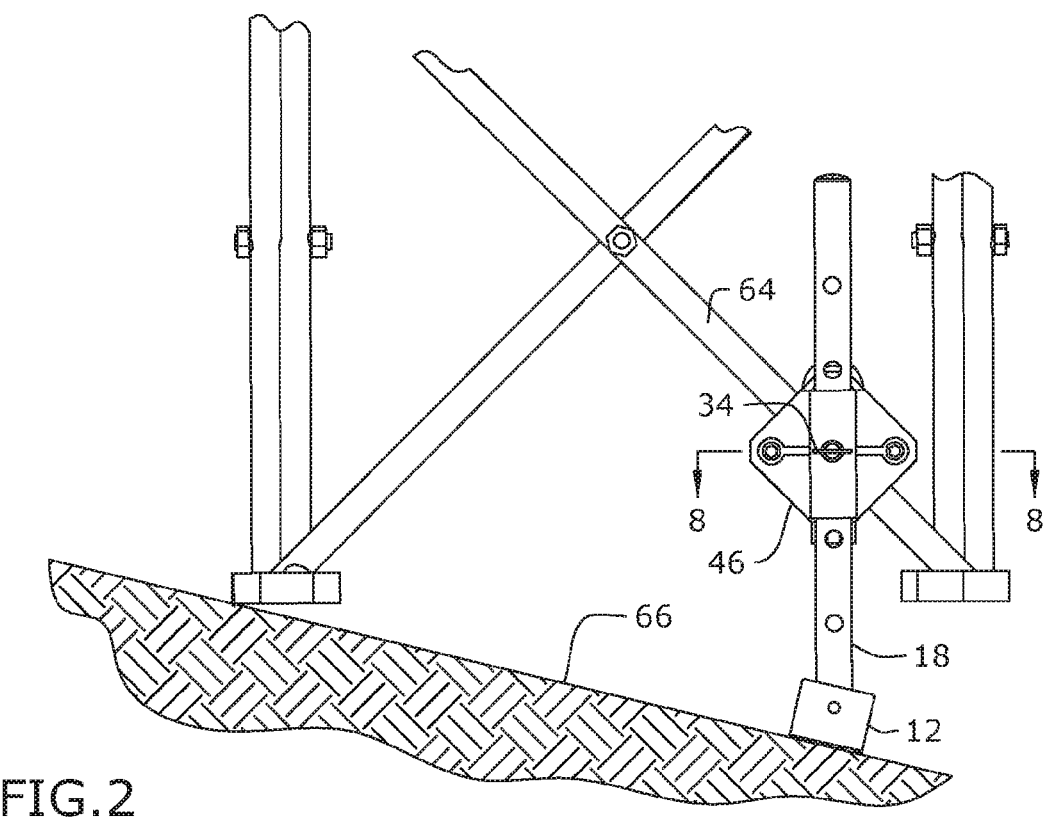
FIG. 2 depicts a side view of certain embodiments of the leg extension apparatus shown in use.
Figure 3:
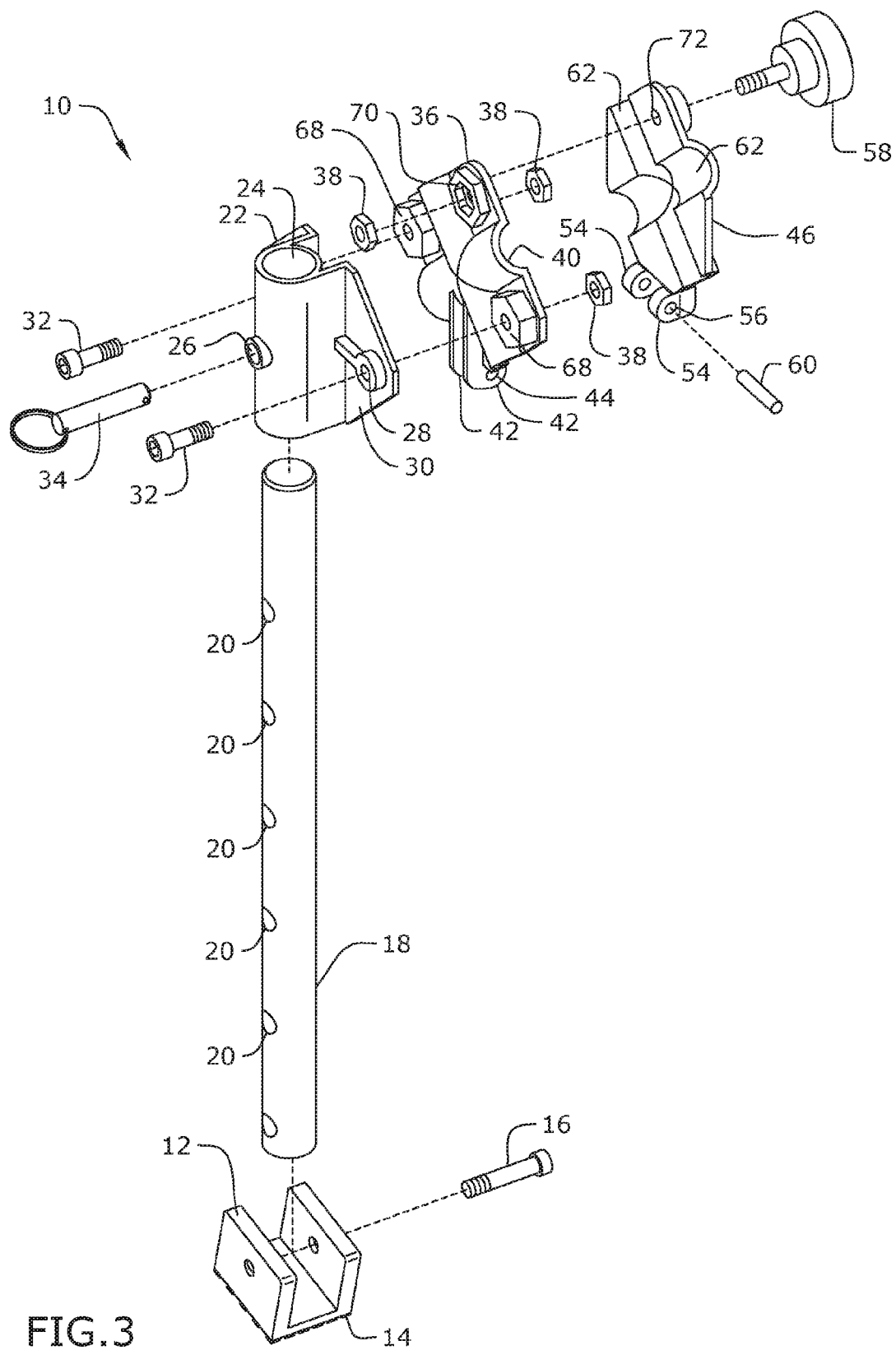
FIG. 3 depicts an exploded view of certain embodiments of the leg extension apparatus.

As depicted in FIGS. 1-3, leg extension apparatus 10 is configured for use with chair legs 64 to support a chair in a level position above ground 66. Leg extension apparatus 10 is especially useful when ground 66 is uneven due to hills, potholes, rocks, or the like. Chair legs 64 may be part of any type of chair such as a lawn chair or other outdoor chair. A pair of leg extension apparatuses 10 are generally mounted to a pair of chair legs 64 to support the chair on a surface such as a downhill location. However, it shall be appreciated that any alternative number of leg extension apparatuses 10 may be coupled to one or more chair legs 64. In certain embodiments, leg extension apparatus 10 generally comprises foot 12, leg bar 18, and a bracket assembly comprising leg bar bracket 22, nut shell bracket 36 and non-nut shell bracket 46.

Figure 9:
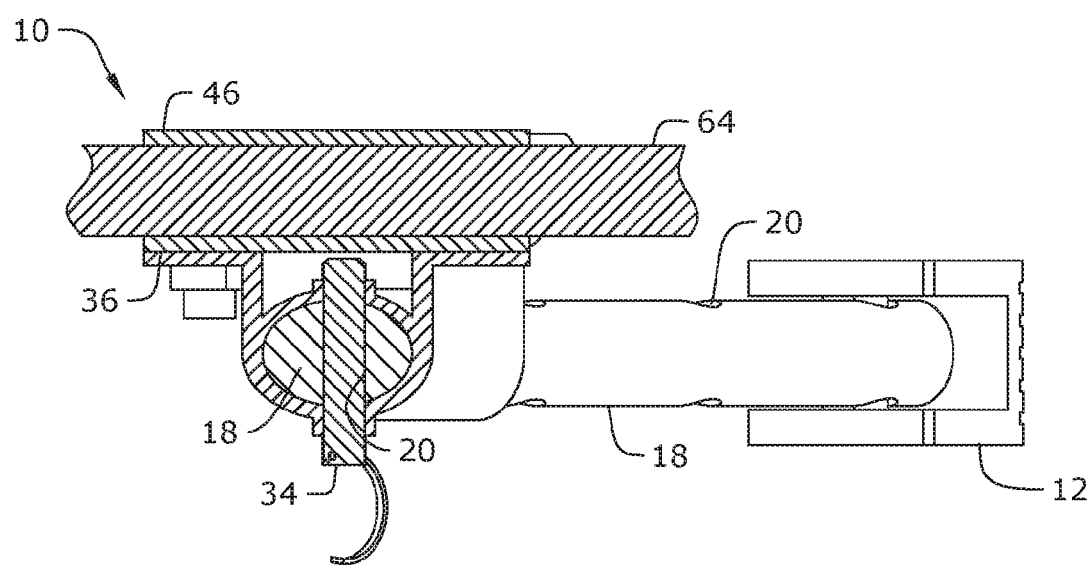
FIG. 9 depicts a section view of certain embodiments of the leg extension apparatus taken along line 9-9 in FIG. 1.

Leg bar bracket 22 is configured to receive leg bar 18 and comprises a tubular member comprising leg opening 24, pin opening 26, flange arms 30 and bracket fastener openings 28. More specifically, leg bar 18 is inserted within leg opening 24 of leg bar bracket 22. This permits leg bar 18 to slidably adjust relative to leg bar bracket 22. Leg bar 18 comprises a shaft with a plurality of leg bar holes 20 disposed throughout the sidewall. Once leg bar 18 is slidably adjusted to a desired position within leg bar bracket 22, pin 34 is inserted through pin opening 26 of leg bar bracket 22 and the corresponding leg bar hole 20 in leg bar 18 as shown in FIGS. 3 and 9. This secures leg bar 18 in one of the plurality of locking positions as determined by the plurality of leg bar holes 20.

Figure 6:
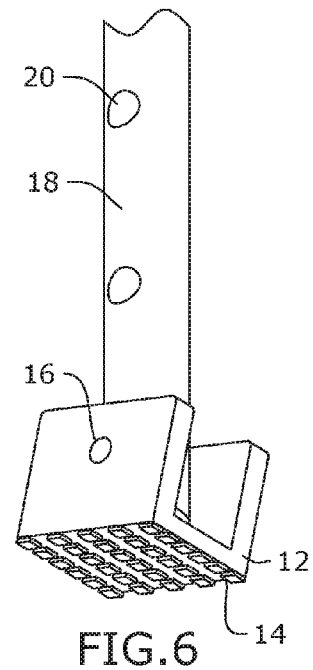
FIG. 6 depicts a bottom perspective view of certain embodiments of the leg extension apparatus illustrating foot 12.
Figure 7:
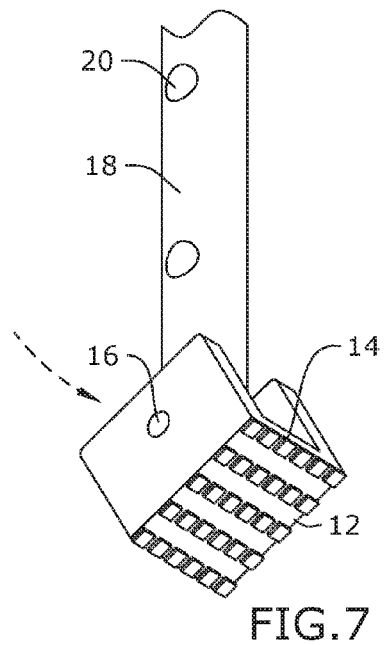
FIG. 7 depicts a bottom perspective view of certain embodiments of the leg extension apparatus illustrating the rotation of foot 12.

As depicted in FIGS. 6-7, foot 12 is pivotably mounted to leg bar hole 20 by fastener 16, which is located proximate the end of leg bar 18. Foot 12 is configured to pivotably adjust to conform to the surface of ground 66. In one embodiment, foot 12 comprises grip members 14 on the bottom surface to enhance friction between foot 12 and ground 66.

Figure 4:
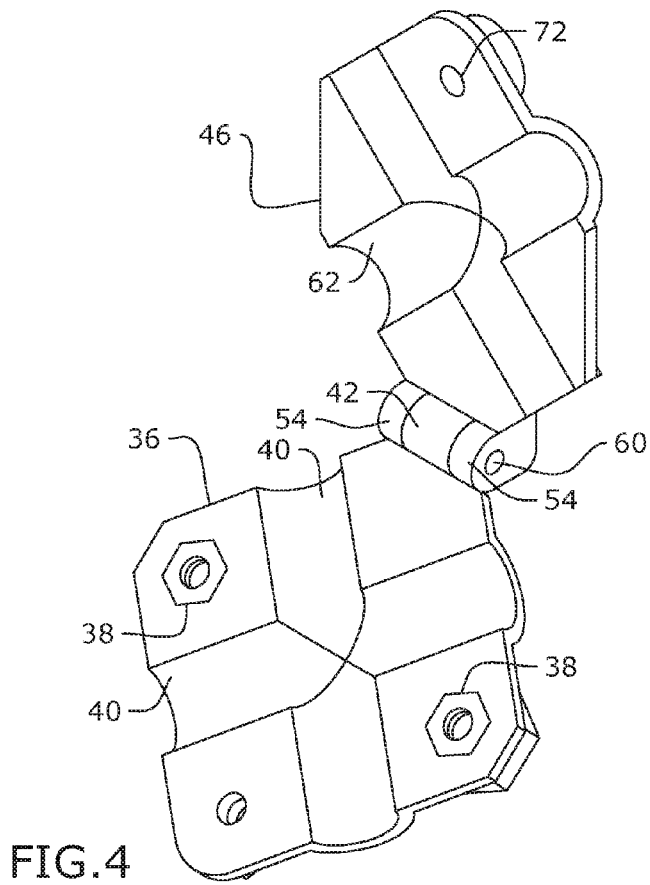
FIG. 4 depicts a perspective view of certain embodiments of the leg extension apparatus in an open configuration.
Figure 5:
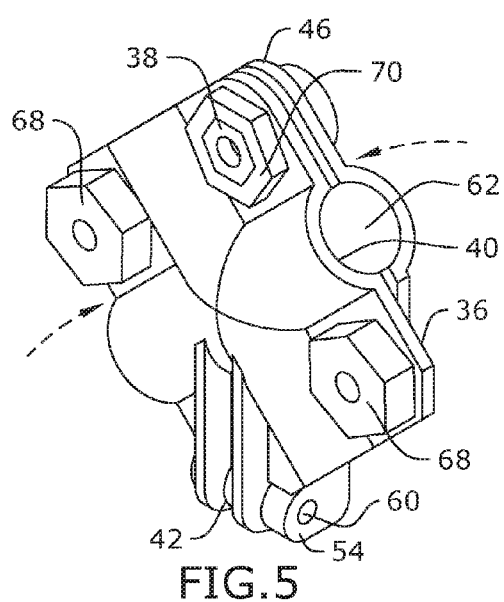
FIG. 5 depicts a perspective view of certain embodiments of the leg extension apparatus in a closed configuration.

Nut shell bracket 36 is configured to be coupled to leg bar bracket 22 and pivotably mounted to non-nut shell bracket 46. As depicted in FIGS. 3-5, nut shell bracket 36 comprises a first side with upper shell support nut 70, lower shell support nuts 68 and nut shell bracket hinge arm 42 with hinge arm openings 44. The second side of nut shell bracket 36 comprises a pair of intersecting chair leg slots 40 and a pair of nuts 38 coupled thereto and aligned with lower shell support nuts 68.

Non-nut shell bracket 46 comprises a first side with a pair of intersecting chair leg slots 62 and non-nut shell bracket arms 54 with hinge arm openings 56. Nut shell bracket 36 and non-nut shell bracket 46 are oriented such that nut shell bracket hinge arm 42 is aligned with non-nut shell bracket arms 54. In this position, pivot pin 60 is inserted through hinge arm openings 56 of non-nut shell bracket 46 and hinge arm openings 44 of nut shell bracket 36. This secures non-nut shell bracket 46 to nut shell bracket 36 and permits pivotal movement of each bracket relative to the other bracket.

Figure 8:
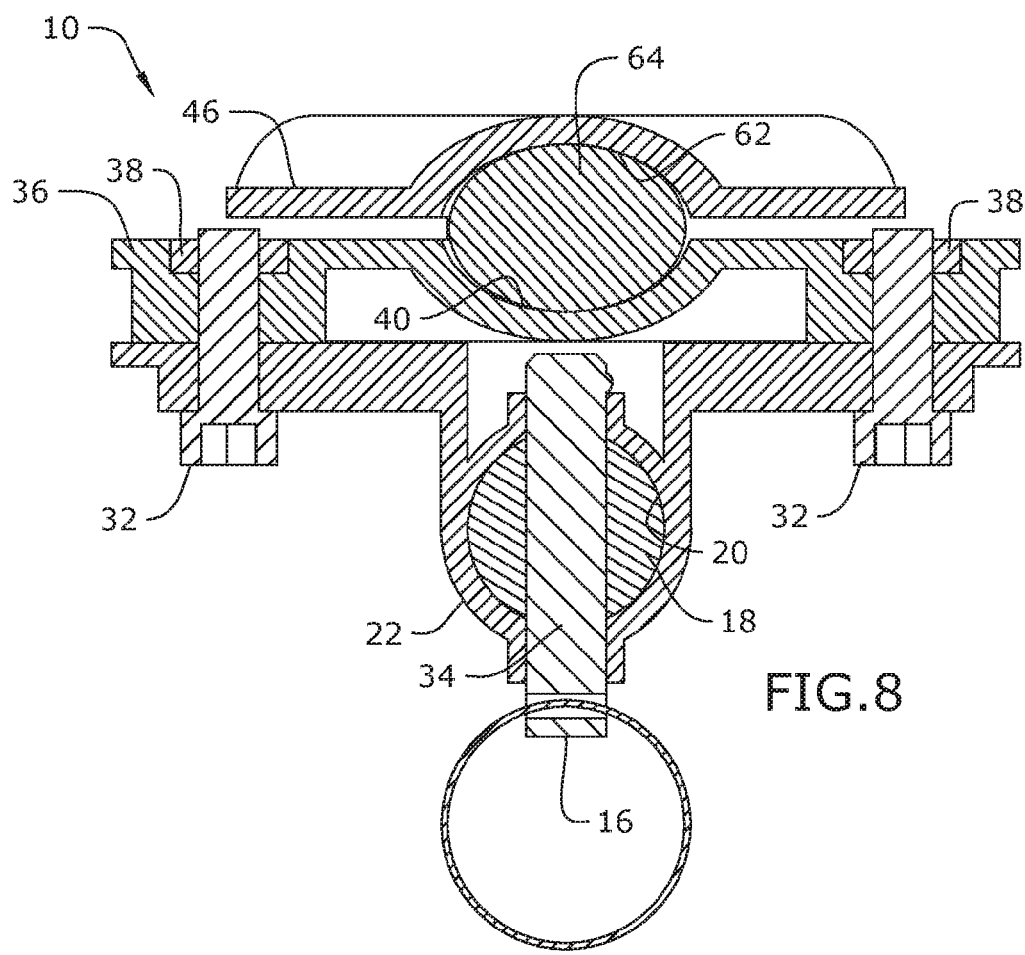
FIG. 8 depicts a section view of certain embodiments of the leg extension apparatus taken along line 8-8 in FIG. 2.

FIG. 4 depicts nut shell bracket 36 and non-nut shell bracket 46 adjusted to the open position. In this position, chair leg 64 can be disposed within any chair leg slot 40, 62. FIG. 5 depicts nut shell bracket 36 and non-nut shell bracket 46 in the closed position, which aligns chair leg slots 40 of nut shell bracket 36 with chair leg slots 62 of non-nut shell bracket 46. In this closed position, chair leg 64 is enclosed within one of chair leg slots 40 and a corresponding chair leg slot 62 as shown in FIG. 8. Nut shell bracket 36 and non-nut shell bracket 46 are locked together in the closed position by inserting securement knob 58 through non-nut shell bracket hole 72, upper shell support nut 70 and nut 38. To unlock nut shell bracket 36 from non-nut shell bracket 46, securement knob 58 is rotated to permit a removal from the components.

As depicted in FIG. 3, leg bar bracket 22 is secured to nut shell bracket 36 by inserting fasteners 32 through bracket fastener openings 28 of leg bar bracket 22 and lower shell support nuts 68 of nut shell bracket 36. Fasteners 32 are secured in place by nuts 38.

In operation, as depicted in FIGS. 1-2, each leg extension apparatus 10 is assembled by enclosing chair leg 64 within nut shell bracket 36 and non-nut shell bracket 46. Securement knob 58 is maneuvered to lock nut shell bracket 36 and non-nut shell bracket 46 together. Leg bar 18 is slidably adjusted relative to leg bar bracket 22 and locked into place in one of a plurality of positions by inserting pin 34 into a desired leg bar hole 20. In the locked position, foot 12 of leg bar 18 extends to contact ground 66. Foot 12 pivotally adjusts to conform to the slope of ground 66. In this position, each leg extension apparatus 10 helps to support the chair in a level position.

It shall be appreciated that the components of leg extension apparatus 10 described in several embodiments herein may comprise any alternative known materials in the field and be of any color, size and/or dimensions. It shall be appreciated that the components of leg extension apparatus 10 described herein may be manufactured and assembled using any known techniques in the field.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A leg extension apparatus mounted to an existing leg of a chair to level the chair on an uneven ground surface, the leg extension apparatus comprising:

a bracket assembly comprising a leg bracket, a first shell bracket coupled to the leg bracket and comprising a first slot, and a second shell bracket pivotably mounted to the first shell bracket and comprising a first slot, the first and second shell brackets configured to pivotably adjust to an open position to receive the leg of the chair and a closed position to permit the leg of the chair to be enclosed within the first slots of both the first and second shell brackets; and a leg slidably mounted to the leg bracket, wherein the leg is configured to slidably adjust to one of a plurality of locking positions to permit an end of the leg to contact the uneven ground surface, thereby supporting the chair in a leveled position.

2. The leg extension apparatus of claim 1, wherein the first shell bracket comprises a second slot that intersects the first slot of the first shell bracket and the second shell bracket comprises a second slot that intersects the first slot of the second shell bracket, wherein the leg of the chair is configured to be enclosed within the second slots of both the first and second shell brackets in the closed position.

3. The leg extension apparatus of claim 2, wherein the leg bracket comprises a pair of flanges, each flange of the pair of flanges comprises an opening, wherein the first shell bracket comprises a pair of nuts coupled thereto, wherein a pair of fasteners are disposed through the openings in the flanges of the leg bracket and the pair of nuts in the first shell bracket, thereby securing the leg bracket to the first shell bracket.

4. The leg extension apparatus of claim 3, wherein the first shell bracket further comprises an upper support nut coupled thereto, wherein a knob fastener is coupled to the second shell bracket and the upper support nut of the first shell bracket to secure the first and second shell brackets together in the closed position.

5. The leg extension apparatus of claim 4, wherein the leg bracket comprises a tubular member with a central opening configured to receive the leg, and a pin opening disposed through the tubular member of the leg bracket, wherein a pin is disposed through the pin opening to engage with the leg in the one of the plurality of locking positions.

6. The leg extension apparatus of claim 5, wherein a foot member is pivotably mounted to the end of the leg, wherein the foot member is configured to pivotably adjust to conform to a slope of the uneven ground surface.

7. The leg extension apparatus of claim 6, further comprising at least one grip member coupled to the bottom of the foot member and configured to contact the ground surface.

\* \* \* \* \*